Figures 1, 2:
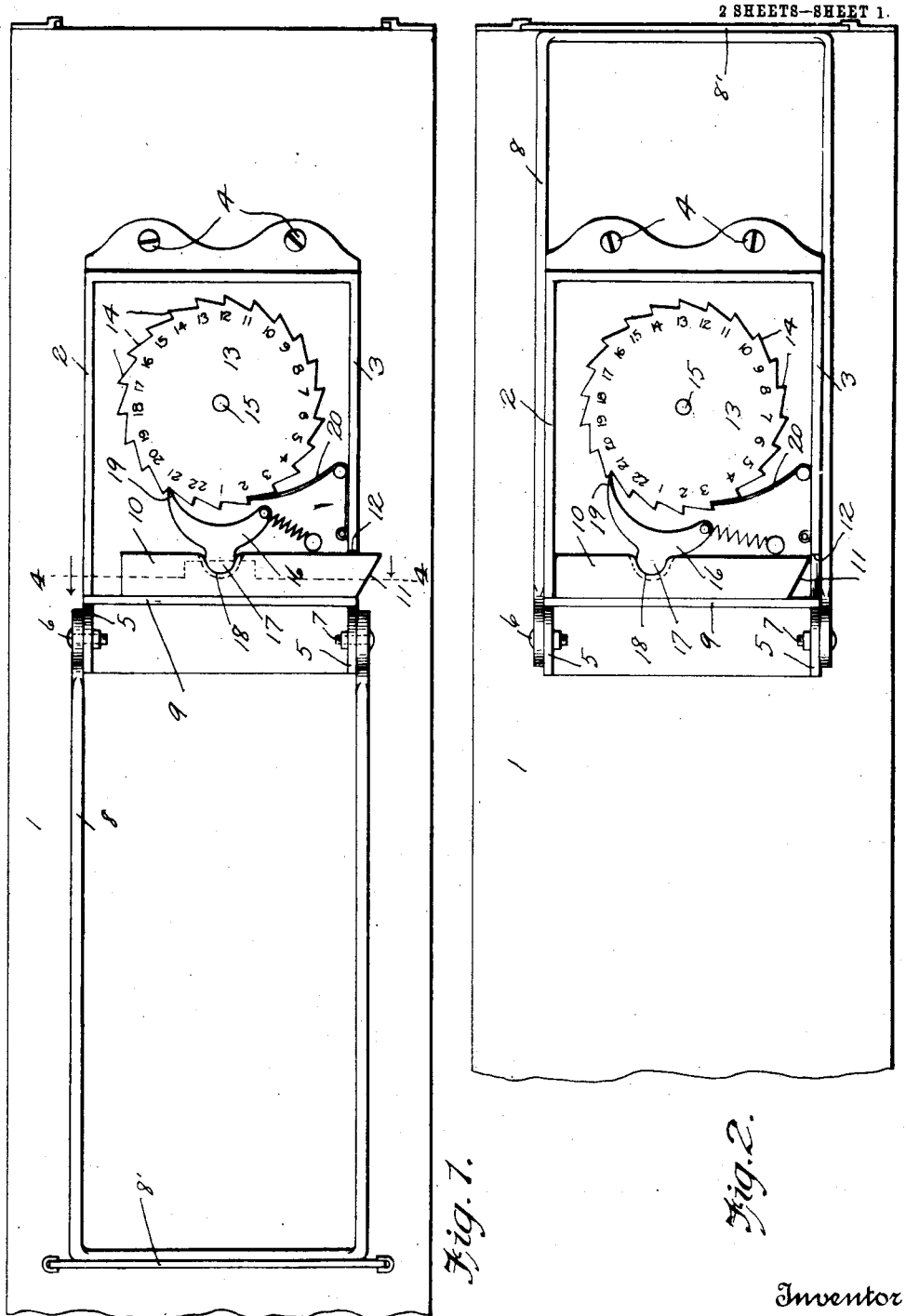

No. 869,150. PATENTED OCT. 22, 1907.
H. H. WARREN.
GRAIN TALLY.
APPLICATION FILED JUNE 3, 1907.

2 SHEETS—SHEET 1.

Witnesses
George Hilton
C. H. Griesbauer

Inventor
Harry H. Warren,
by H. B. Willson & Co
Attorneys

No. 869,150. PATENTED OCT. 22, 1907.
H. H. WARREN.
GRAIN TALLY.
APPLICATION FILED JUNE 3, 1907.
2 SHEETS—SHEET 2.
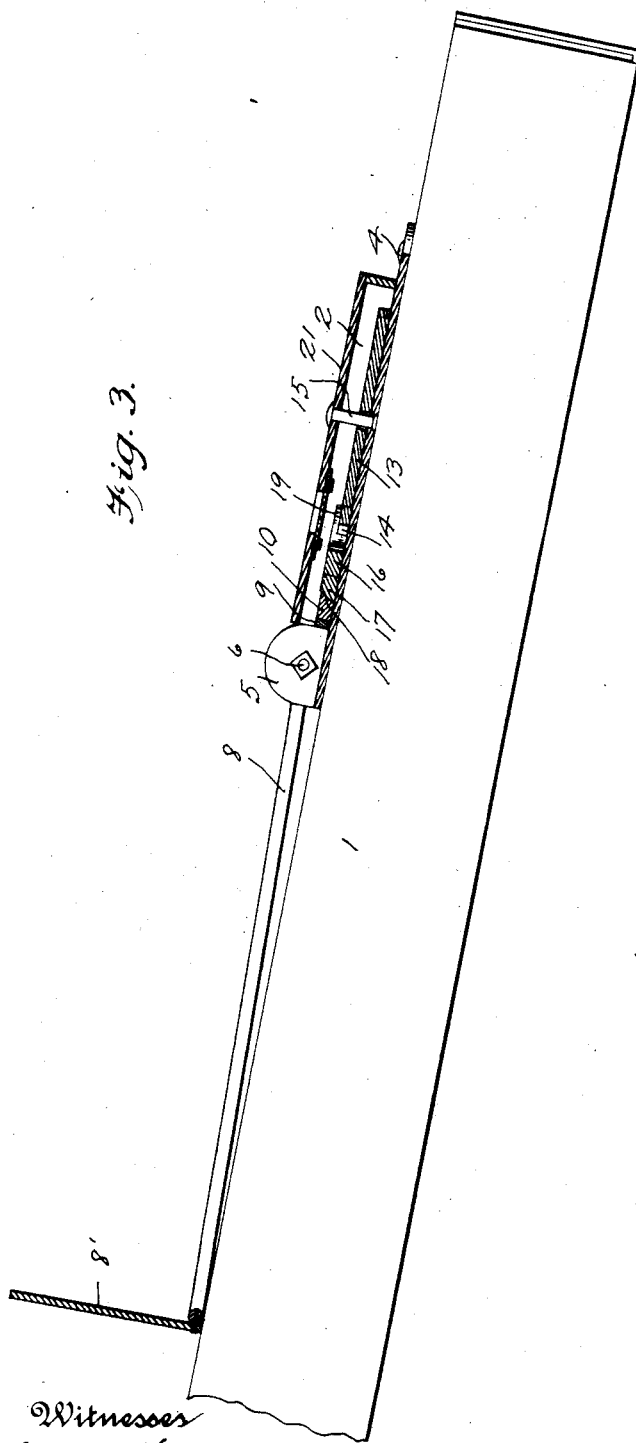
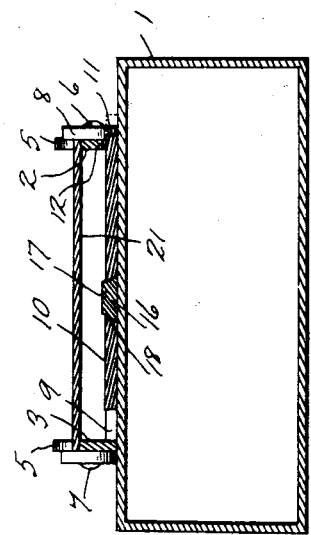
Witnesses
George Hilton
C. H. Griesbauer
Inventor
Harry H. Warren,
by H. B. Willson & Co
Attorneys

UNITED STATES PATENT OFFICE.

HARRY H. WARREN, OF SHERIDAN, ILLINOIS, ASSIGNOR OF ONE-HALF TO WILLIAM P. WARREN, OF SHERIDAN, ILLINOIS.

GRAIN-TALLY.

No. 869,150.　　　Specification of Letters Patent.　　　Patented Oct. 22, 1907.

Application filed June 3, 1907. Serial No. 377,010.

*To all whom it may concern:*

Be it known that I, HARRY H. WARREN, a citizen of the United States, residing at Sheridan, in the county of Lasalle and State of Illinois, have invented certain new and useful Improvements in Grain-Tallies; and I do declare the following to be a full, clear, and exact description of the invention, such as will enable others skilled in the art to which it appertains to make and use the same.

My invention has relation to new and useful improvements in grain tallies adapted for use where a dry substance, such as wheat, corn or the like is to be lowered through a spout or chute, and the unit of measure determined by opening and closing the spout. For example, it may be attached to the spout of a threshing machine, a wagon driven under the spout and the grain tally serve to close the mouth of the spout when the bed or box of the wagon is filled, and simultaneously cause a graduated dial to move one notch, so that the number of loads of wheat may be recorded.

With the foregoing and other objects in view, the invention consists of certain novel features of construction, combination and arrangement of parts, as will be more fully described and particularly pointed out in the appended claims.

In the accompanying drawings,—Figure 1 is a plan view of the tally secured in position to a spout or chute, the gate open and the dial cover removed; Fig. 2 is a similar view with the gate closed; Fig. 3 is a central longitudinal sectional view looking in the direction of the arrows, the dial cover in position; Fig. 4 is a cross sectional view on the line 4—4 of Fig. 1, looking in the direction of the arrows, the dial cover in position.

Referring more particularly to the drawings, the numeral 1 represents a chute or spout. A tally box having a suitable bottom and sides 2 and 3, respectively, is secured preferably in removable position near the mouth of the spout or chute by screws 4 or other equivalent means, the inner ends of the sides 2 of the tally box preferably terminating in enlargements or heads 5, although this is not essential to the operation of the invention, and having pivoted thereto by bolts and nuts 6 and 7, respectively, or other equivalent means, the ends of an operating bail 8 of preferably U-shaped form, the purpose of which will be disclosed. A transverse gate 8′ is secured in any suitable manner to the central portion of the bail and is adapted to close the mouth of the spout. A cross guide bar 9 is arranged transversely of and near the heads or enlargements 5 of the tally box and serves as a bearing surface for a laterally movable plunger or operating bar 10, working on the bottom of the tally box and against said bar, and having a beveled end 11 cut on a suitable angle adapted to work through a corresponding opening or slot 12 in the adjacent side of the tally box.

A graduated dial 13 having teeth 14 beveled to the form of ratchet teeth corresponding to the numbers on its face, is fixed to the upper end of a staff 15 journaled at its lower end to the bottom of the tally box and is adapted to be intermittently moved by a dog 16 pivoted at one end to the bottom of the grain tally adjacent the dial, having a head 17 adapted to fit in a corresponding recess or socket 18 in the adjacent edge of the plunger or operating bar 10, and a toe 19 adapted to engage the teeth of the dial. A spring 20 is fixed at one end to the bottom of the grain tally and engages the teeth of the dial at its opposite end, so as to prevent reverse rotation thereof.

In the operation of the invention a wagon, bushel basket or other measure to be filled is placed under the mouth of the spout or chute, and after the same has filled the gate 8′ is swung down under the mouth of the spout or chute to cut off the supply of the grain to the measure. In swinging the gate down to close the mouth of the spout, the inner side of one of the arms of the operating bail engages the bevel edge 11 of the laterally moving plunger and causes the dog or pawl 16 to turn the dial 13 one notch, indicating that one load, bushel or other quantity of wheat represented by the measure to be filled has passed through the spout. To refill the measure the gate is swung back into its normal position to disclose the mouth of the spout, and a coiled spring 20 fixed at one end near the pivoted end of the dog or pawl and at its opposite end to the bottom of the grain tally moves the reciprocatory plunger back into its normal position. (See Fig. 1.)

21 is a dial cover which is fixed to the upper end of the dial staff 15 to protect the dial so that the same may not become easily deranged or inoperative, said cover being provided with a suitable glass plate 22 at a point over the edge of the dial to enable the number recorded on the dial to be read.

It is thought that from the foregoing description, taken in connection with the drawings, the construction and operation of the invention will be understood without requiring a more extended explanation.

Having described my invention, what I claim as new and desire to secure by Letters-Patent, is:—

1. In a grain tally the combination of a tally box, a laterally moving reciprocatory bar working therein, a graduated ratchet dial journaled in said box, a pawl pivoted to said reciprocatory bar and adapted to intermittently move said dial when said bar is moved in one direction, and means coacting with said pawl for moving said bar in the opposite direction, substantially as described.

2. In combination with a spout or chute, a tally box secured near the mouth thereof, an operating bail pivoted to the inner end of said box, a gate secured to said bail and adapted to close the mouth of the spout or chute, a laterally moving reciprocatory bar working in the tally box and having an inclined edge adapted to work through one of the sides thereof, a graduated ratchet dial journaled in said box, and a pawl operable by said reciprocatory bar adapted to intermittently move said dial one notch, substantially as described.

3. In combination with a spout or chute, a tally box arranged longitudinally of and near the mouth of the same, an operating bail pivoted to one end of said tally box, a gate secured to said bail and adapted to close the mouth of the spout or chute, a laterally moving reciprocatory bar working in said box, and having an inclined edge working through one side thereof, a pawl pivoted in said box and adapted to intermittently move said dial when said reciprocatory bar is moved in one direction, and a resilient element coacting with said pawl to move the said bar in the opposite direction.

4. In combination with a spout or chute, a tally box arranged longitudinally of and near the mouth of the same, a laterally moving reciprocatory bar working in said box and having an inclined edge working through one of the sides thereof, a U-shaped operating bail pivoted at its ends to one end of said box, one of the arms of said bail being adapted to engage the inclined edge of the reciprocatory bar when it is swung in one direction, and a gate secured to the bail and adapted to close the mouth of the spout or chute.

In testimony whereof I have hereunto set my hand in presence of two subscribing witnesses.

HARRY H. WARREN.

Witnesses:
OLIVER REESE,
F. G. ARNTZEN.